3,452,086
SUBSTITUTED TARTRANILIC ACID RESOLVING AGENTS
Thomas Alfred Montzka, Manlius, N.Y., assignor to Bristol-Myers Company, New York, N.Y., a corporation of Delaware
No Drawing. Filed Apr. 29, 1966, Ser. No. 546,208
Int. Cl. C07c *103/16*
U.S. Cl. 260—519      5 Claims

ABSTRACT OF THE DISCLOSURE (+)-2′-nitrotartranilic acid, (+)-2,4-dichlorotartranilic acid, (+)-2′-chlorotartranilic acid, (+)-4′-chlorotartranilic acid, and (+)-4′-bromotartranilic acid hydrate were prepared and found to be useful resolving agents for amines such as 6,7-dimethoxy-1β-hydroxyethyl-2-methyl-1,2,3,4-tetrahydroisoquinoline and ethyl 6,7-dimethoxy-1,2,3,4-tetrahydroisoquinoline-1-acetate.

---

This invention relates to novel resolving agents for amines and, more particularly, to certain dextro-rotatory substituted tartranilic acids.

Organic amines of pharmacological interest which contain an asymmetric carbon atom are usually prepared by ordinary syntheses which produce racemic mixtures. However, one optical isomer is usually far more potent pharmacologically than the other and thus it is highly desirable to resolve the racemate. Recrystallization of salts formed with naturally available, inexpensive, optically active acids is the method commonly used but it frequently fails, particularly when crystalline salts are not obtained or when the salts have too great a solubility to permit fractional recrystallization. Additional acidic resolving agents are therefore urgently needed.

It was the object of the present invention to provide optically active acids which could be made inexpensively and would yield crystalline, insoluble salts with racemic amines and function effectively as resolving agents.

The objects of the present invention have been achieved by the provision, according to the present invention, of optically active acids having the formula

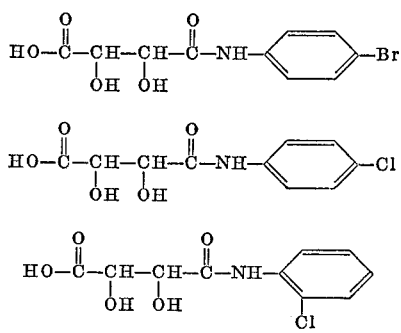

I wherein $R^1$ is hydrogen, chloro, bromo or nitro and $R^2$ is hydrogen, chloro or bromo but $R^1$ and $R^2$ are not each hydrogen.

The preferred embodiments of the present invention are the acids having the formulae

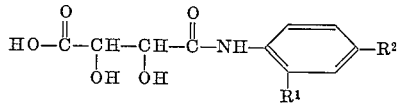

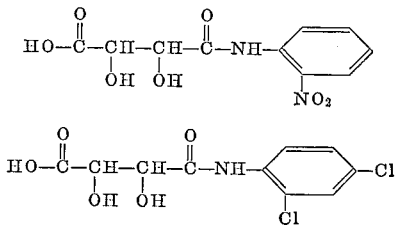

There is also provided, according to the present invention the process of preparing a dextro-rotatory tartranilic acid, and preferably a substituted tartranilic acid having the formula

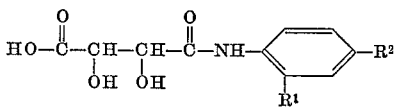

which comprises the consecutive steps of:

(a) heating a mixture of (+)-2,3-diacetyl-succinic anhydride or its functional equivalent as an acylating agent for primary amines and an aniline, and preferably a substituted aniline having the formula

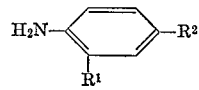

wherein $R^1$ and $R^2$ have the meaning set out above, to produce the corresponding diacetyl-tartranilic acid, and
(b) deacetylating said diacetyl-tartranilic acid by treatment with alkali to produce the desired dextro-rotatory tartranilic acid.

There is further provided by the present invention the process of resolving a racemic organic amine which comprises:

(a) forming a mixture of the two enantiomeric salts of said amine with a dextro-rotary ring-substituted tartranilic acid, said substituent comprising preferably at least one nitro, chloro or bromo group,
(b) separating said enantiomeric salts by fractional crystallization and then
(c) converting said separated enantiomeric salts to the respective optical isomers of the organic amine, preferably by treatment with a strong base.

Dextro-rotatory 3′-nitro- and 4′-nitro-tartranilic acids have been prepared by J. B. Tingle et al. [J. Amer. Chem. Soc. 31, 1312 (1909), C.A. 4, 908 (1910)] but were never used as resolving agents and were prepared by the cumbersome procedure of fusing the nitroaniline with tartaric acid. See also Landersteiner et al., J. Expt'l Med., 50, 407 (1929).

Dextro-rotatory tartranilic acid itself is well known and, for example, was prepared by F. Barrow et al. [J. Chem.

Soc. (1939), 638–640] by heating aniline hydrogen tartrate 8 hours at 140° C. It was then used by Barrow et al. to resolve certain alcohols by the elaborate procedure of forming an ester, recrystallizing to separate the enantiomers and saponifying the ester to liberate the alcohol. Such saponification is particularly undesirable because it frequently leads to racemization or to dehydration of the alcohols due to the strongly alkaline conditions and high temperatures required; thus, Barrow et al. report several total or partial failures with their procedure as with α-terpineol, α-phenylethyl alcohol, sec.-butyl alcohol and β-methyl-n-butyl alcohol.

The (+)-2,3-diacetylsuccinic anhydride used as a starting material is prepared according to Organic Syntheses, Collected vol. IV, p. 242, Wiley (1963) or, preferably, as exemplified below. It is apparent that it can be replaced by the corresponding mono-acid halides or mono-mixed anhydrides and other functional equivalents for the acylation of anilines.

The following examples are given to illustrate the present invention but it is not limited thereto. All temperatures are given in degrees centigrade. The amines used to illustrate the desirable properties of the compounds of the present invention as resolving agents have the structures

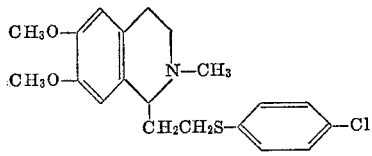

and

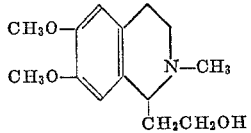

The former is a potent analgesic agent and muscle relaxant. The optical isomers of the latter are converted into optical isomers of both the former and many congeners thereof as described in detail below by the following series of reactions:

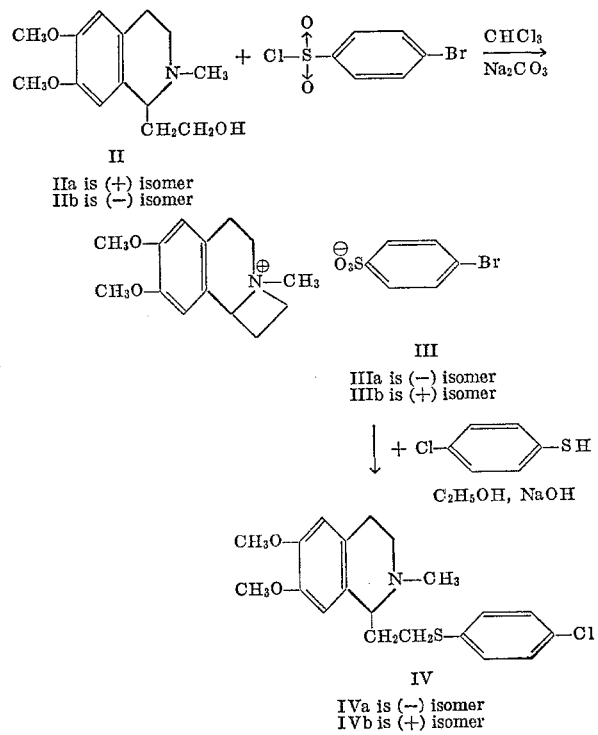

PREPARATION OF RESOLVING AGENTS

Example 1

(+)-2'-nitrotartranilic acid.—(+)-2,3-diacetylsuccinic anhydride (44 g., 0.2 mole) and 2-nitroaniline (35 g., 0.25 mole) were placed with 300 ml. methylene chloride and heated under reflux for 3½ hours. This solution was cooled to room temperature and treated dropwise with stirring with a solution of 39 g. potassium hydroxide (86% pellets; 0.6 mole) in 400 ml. water. This was stirred 1 hour at room temperature. The layers were separated and the methylene chloride layer was extracted with 100 ml. more water. The combined aqueous layers were heated on a steam bath, treated with decolorizing carbon, filtered hot through diatomaceous earth ("Celite"), acidified with 50 ml. conc. hydrochloric acid and cooled at 5° C. overnight. The crystals were collected and washed with 100 ml. cold water to yield 32 g. yellow crystals. This material was taken up in 300 ml. hot water, treated with 15 ml. conc. hydrochloric acid and cooled. Collection of the crystals gave 28 g. (52%) of 2'-nitrotartranilic acid. A sample was recrystallized from n-propanol for analysis, M.P. 196.0–198.0, $[\alpha]_D^{25}$ +71.3° (c. 2.5, ethanol), $[\alpha]_D^{25}$ +89.8° (c. 0.83, $H_2O$).

Analysis.—Calc'd for $C_{10}H_{10}N_2O_7$: C, 44.45; H, 3.73; N, 10.37. Found: C, 44.41; H, 3.79; N, 10.31.

Example 2

(+)-2,4-dichlorotartranilic acid.—(+)-2,3-diacetylsuccinic anhydride (22 g.; 0.1 mole) and 2,4-dichloroaniline (18 g.; 0.11 mole) in 150 ml. methylene chloride were stirred together for 2 hours. A solution of 21 g. potassium hydroxide (87% pellets; 0.32 mole) in 200 ml. water was added and the two phase system stirred vigorously for 1 hour. The methylene chloride layer was separated, extracted with 100 ml. water and discarded. The combined aqueous extracts were warmed on a steam bath, filtered, acidified with 35 ml. conc. hydrochloric acid and cooled for crystallization. Collection of this material gave 17 g. (59%) colorless (+)-2',4'-dichlorotartranilic acid. Several crystallizations from water gave an analytical sample, M.P. 182.5–192.5°, $[\alpha]_D^{25}$ +100.7° (c. 1.6, 95% ethanol).

Analysis.—Calc'd for $C_{10}H_9NO_5$: C, 40.84; H, 3.08; N, 4.76. Found: C, 40.84; H, 3.21; N, 4.57.

Example 3

(+)-2,3-diacetoxysuccinic anhydride.—A mixture of (+) tartaric acid (150 g.; 1 mole) in 700 ml. acetic anhydride was warmed with stirrring until the exothermic reaction started. Heating was discontinued and the reaction was allowed to run its course (about 2–3 hours). The colorless solution was concentrated to dryness at reduced pressure. Final drying under high vacuum gave a quantitative yield of (+)-2,3-diacetoxysuccinic anhydride (216 g.) of good purity. This material may be recrystallized from ehyl acetate—"Skellysolve B" if better purity is desired. Recrystallized material has a melting point of 133.0–133.5° and $[\alpha]_D^{25}$+60.5° (c. 6.2 acetone).

Substituted tartranilic acids V (a–e).—(+)-2,3-diacetoxysuccinic anhydride (21.6 g.; 0.1-mole) and substituted aniline (0.11 mole) in 200 ml. methylene chloride were heated under reflux for 3 hours. This solution was treated with a solution of potassium hydroxide (21 g. of 86% potassium hydroxide pellets; 0.32 mole) in 200 ml. water and stirred vigorously for 15 minutes. The methylene chloride layer was separated and extracted with 100 ml. water. The combined aqueous layers were stirred for 2 hours, then warmed to solution, treated with decolorizing carbon (if necessary), filtered through diatomaceous earth ("Celite"), acidified with 35 ml. conc. hydrochloric acid and cooled immediately for crystallization. The crystals were collected, washed with water, and then recrystallized from the indicated solvent.

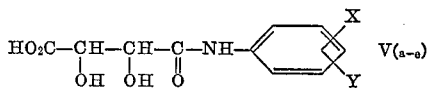

| X, Y | Cryst. solvent | $[\alpha]_D^{25}$ (c) [1] | M.P., °C. | Yield, percent |
|---|---|---|---|---|
| Va........ 2-NO$_2$............ | H$_2$O (HCl)[2]..... | +89.8° (0.8, H$_2$O). | 196.0-198.0 | 50 |
| Vb........ 2,4-diCl........... | H$_2$O or HOAc[3] | +100.7° (1.6)...... | 182.5-192.5 | 59 |
| Vc........ 2-Cl............... | H$_2$O............... | +99.4° (1.6)....... | 180.5-182.5 | 47 |
| Vd........ 4-Cl............... | Ethanol-H$_2$O... | +108.9° (1.6)...... | 193.0-195.0 | 85 |
| Ve........ 4-Br (hydrate).. | Ethanol-H$_2$O.... | +90.5° (1.8)....... | 198.5-201.5 | 67 |

[1] Unless otherwise indicated rotations were taken in 95% ethanol.
[2] This material sometimes crystallizes containing ~25% potassium salt. Recrystallization from dilute HCl converts to 100% acid.
[3] This material tends to form a gel on recrystallization. It is recommended that it not be recrystallized.

Example 4

(+)-2'-chlorotartranilic acid.—(+)-2,3 - diacetoxysuccinic anhydride (21.6 g.; 0.1 mole) and 2-chloroaniline (12.8 g.; 0.1 mole) in 100 ml. methylene chloride were heated under reflux for one hour. This solution was treated with a solution of potassium hydroxide (22 g.— 86% pellets; 0.32 mole) and the methylene chloride was removed under reduced pressure. The remaining aqueous solution was heated on a steam bath 20 minutes, filtered hot, acidified with 35 ml. conc. hydrochloric acid and cooled to yield 12.1 g. (47%) crystalline (+)-2'-chlorotartranilic acid. Recrystallization from water gave analytical material, M.P. 180.5–182.5°, $[\alpha]_D^{25}$ +99.4 (c. 1.65, 95% ethanol).

Analysis.—Calc'd for C$_{10}$H$_{10}$ClNO$_5$: C, 46.26; H, 3.88; N, 5.40. Found: C, 46.22; H, 3.48; N, 5.32.

Example 5

(+)-4'-chlorotartranilic acid.—(+)-2,3 - diacetoxysuccinic anhydride (22 g.; 0.1 mole) and 4-chloroaniline (15 g.; 0.12 mole) in 150 ml. methylene chloride were stirred together for one hour. This solution was treated with a solution of potassium hydroxide (21 g.—86% pellets; 0.32 mole) in 50 ml. water. This two phase system was stirred vigorously for 1 hour. The layers were separated and the organic layer extracted with 100 ml. water. The combined aqueous layers were heated to drive off any residual methylene chloride, filtered and acidified with 30 ml. conc. hydrochloric acid. After cooling the crystals were collected to give 24.2 g. (90%) (+)-4'-chlorotartranilic acid. Recrystallization twice from 3:1 water:ethanol gave an analytical sample, M.P. 193.0–195.0°, $[\alpha]_D^{25}$ +108.9° (c. 1.64, 95% ethanol).

Analysis.—Calc'd for C$_{10}$H$_{10}$ClNO$_5$: C, 46.26; H, 3.88; N, 5.40. Found: C, 46.65, 46.62; H, 4.04, 4.05; N, 5.34.

Example 6

(+) - 4'-bromotartranilic acid hydrate.—(+)-2,3-diacetoxysuccinic anhydride (21.6 g.; 0.1 mole) and 4-bromoaniline (17.2 g.; 0.1 mole) were placed with 200 ml. methylene chloride and heated under reflux for 3 hours. This solution was treated with a solution of potassium hydroxide (21 g.—86% pellets; 0.32 mole) in 200 ml. water and stirred vigorously for 10 minutes. The methylene chloride layer was separated and extracted with 100 ml. water. The combined aqueous layers were stirred for 2 hours, warmed, filtered and acidified to give 20.5 g. (67%) crystalline (+)-4'-bromotartranilic acid hydrate. This was recrystallized from ethanol-water with a decolorizing carbon treatment to give 15 g. analytically pure (+)-4'-bromotartaranilic acid hydrate, M.P. 198.5–201.5°, $[\alpha]_D^{25}$ +90.5° (c. 1.8, 95% ethanol).

Analysis.—Calc'd for C$_{10}$H$_{10}$BrNO$_5$·H$_2$O: C, 37.28; H, 3.76; N, 4.35; H$_2$O, 5.59. Found: C, 37.07; H, 3.61; N, 4.32; H$_2$O, 5.68.

USE OF RESOLVING AGENTS

Example 7

Resolution of (±)-6,7-dimethoxy-1-β-hydroxyethyl-2-methyl-1,2,3,4-tetrahydroisoquinoline IIa and b.—To a warm solution of 73.1 g. (0.292 mole) of (±)-6,7-dimethoxy - 1 - β-hydroxyethyl-2-methyl-1,2,3,4-tetrahydroisoquinoline in 375 ml. of 95% ethanol was added a warm solution of 39.4 g. (0.146 mole) (+)-2'-nitrotartranilic acid in 375 ml. of 95% ethanol. The crystals (75.9 g.) were collected after storage at 5° C. for 20 hours. One recrystallization from 750 ml. of 80% ethanol gave 69.8 g. (92%) of material, M.P. 193.5–195.5° C.

This material was converted to its free base by neutralization with aqueous sodium carbonate and extraction with ethyl acetate. Concentration of the ethyl acetate extracts gave 30.0 g. of oil. This oil gave a crystalline hydrochloride from isopropanol and 10 ml. of conc. hydrochloric acid. One recrystallization from 150 ml. of absolute ethanol gave 22.3 g. (55%) of (+)-6,7-dimethoxy - 1 - β-hydroxyethyl-2-methyl-1,2,3,4-tetrahydroisoquinoline hydrochloride (IIa), M.P. 177–180°, $[\alpha]_D^{25}$ +22.7° (c. 2.05, chloroform).

Analysis.—Calc'd for C$_{14}$H$_{21}$NO$_3$·HCl: C, 58.43; H, 7.71; N, 4.87. Found: C, 58.67; H, 7.81; N, 4.63.

The mother liquor from the original crystallization was concentrated to ⅕ its original volume, and treated with 1.0 g. (+)-2-nitrotartranilic acid in 25 ml. of 95% ethanol. The solution was concentrated to dryness and the resultant oil taken up in ethyl acetate, filtered, washed with aqueous soduim carbonate, dried over anhydrous sodium sulfate, and concentrated to dryness to give 33.6 g. of an oil. This oil gave a crystalline hydrochloride from acetone-dry hydrogen chloride. One recrystallization from 95% ethanol gave 24.4 g. (60%) of (−)-6,7-dimethoxy-1 - β - hydroxyethyl-2-methyl-1,2,3,4-tetrahydroisoquinoline hydrochloride (IIb), M.P. 177–179°, $[\alpha]_D^{25}$ −22.8° (c. 2.02 chloroform).

Analysis.—Calc'd for C$_{14}$H$_{21}$NO$_3$·HCl: C, 58.43; H, 7.71; N, 4.87. Found: C, 58.41; H, 7.81; N, 4.67

(−) - [2,1-a]azetidino-6,7-dimethoxy-2-methyl-1,2,3,4-tetrahydroisoquinolinium - p - bromobenzenesulfonate IIIa.—(+)-6,7 - dimethoxy - 2-methyl-1,2,3,4-tetrahydroisoquinoline hydrochloride (23.8 g., 0.083 mole) was converted to its free base by neutralization with sodium carbonate and extraction with 200 ml. chloroform. The chloroform extract was dried over sodium sulfate and filtered. This solution was then treated with 23.2 g. (0.091 mole) of p-bromobenzenesulfonyl chloride and stirred for 4 hours at room temperature. Anhydrous sodium carbonate (44 g.) was then added and stirring was continued for 16 hours. The reaction mixture was filtered and the filtrate concentrated to give 38 g. of crude crystalline material. One recrystallization from isopropanol gave 26.8 g. (69%) of analytical material (IIIa), M.P. 178–180°, $[\alpha]_D^{25}$ −115.7° (c. 2.02, chloroform).

Analysis.—Calc'd for C$_{20}$H$_{24}$BrNO$_5$S: C, 57.01; H, 5.14; N, 2.98. Found: C, 51.24; H, 5.24; N, 2.85.

(+) - [2,1 - a]azetidino-6,7-dimethoxy-2-methyl-1,2,3, 4 - tetrahydroisoquinolinium - p - bromobenzenesulfonate IIIb.—(−) - 6,7 - dimethoxy - 2 - methyl-1,2,3,4-tetrahydroisoquinoline hydrochloride (22.6 g., 0.079 mole) was converted to its free base by neutralization with sodium carbonate and extraction with 200 ml. chloroform. The chloroform extract was dried over sodium sulfate and filtered. This solution was then treated with 21.8 g. (0.085 mole) of p-bromobenzenesulfonyl chloride and stirred for 4 hours at room temperature. Anhydrous sodium carbonate (41.5 g.) was added and stirring was continued for 16 hours. The reaction mixture was filtered and the filtrate concentrated to give 39 g. of crude crystalline material. One recrystallization from isopropanol gave 26.0 g. (70.3%) of analytical material, IIIb, M.P. 179.5–108.5°, $[\alpha]_D^{25}$ +114.2° (c. 2.00, chloroform).

Analysis.—Calc'd for $C_{20}H_{24}BrNO_5S$: C, 51.07; H, 5.14; N, 2.98. Found: C, 51.11; H, 5.12; N, 2.75.

(−) - 1 - (β - p - chlorothiophenoxyethyl)-6,7-dimethoxy - 2 - methyl - 1,2,3,4-tetrahydroisoquinoline IVa.—A solution of 0.3 g. (0.0075 mole) of sodium hydroxide and 1.09 g. (0.0075 mole) of p-chlorothiophenol in 30 ml. of absolute ethanol was treated with 3.53 g. (0.0075 mole) of (−)-[2,1-a]azetidino-6,7-dimethoxy-2-methyl-1,2,3,4 - tetrahydroisoquinolinium - p - bromobenzenesulfonate IIIa and heated on a steam bath for 5 min. The reaction mixture was cooled, diluted with an equal volume of ethyl ether, and filtered. The filtrate was concentrated to an oil which crystallized upon standing. One recrystallization from 95% ethanol gave 1.65 g. (58%) of analytical material (IVa), M.P. 54.5–55.5°, $[\alpha]_D^{25}$ −36.5° (c. 2.05, chloroform).

Analysis.—Calc'd for $C_{20}H_{24}ClNO_2S$: C, 63.56; H, 6.40; N, 3.71. Found: C, 63.71; H, 6.45; N, 3.56.

(+) - 1 - (β - p - chlorothiophenoxyethyl)-6,7-dimethoxy - 2 - methyl-1,2,3,4-tetrahydroisoquinoline IVb.—A solution of 0.3 g. (0.0075 mole) of sodium hydroxide and 1.09 g. (0.0075 mole) of p-chlorothiophenol in 30 ml. of absolute ethanol was treated with 3.53 g. (0.0075 mole) of (+)-[2,1-a]azetidino-6,7-dimethoxy-2-methyl-1,2,3,4-tetrahydroisoquinolinium - p - bromobenzenesulfonate (IIIb) and heated on a steam bath for 5 min. The reaction mixture was cooled, diluted with an equal volume of ethyl ether, and filtered. The filtrate was concentrated to an oil which crystallized upon standing. One recrystallization from 95% ethanol gave 0.85 g. (30%) of analytical material, M.P. 53–54°, $[\alpha]_D^{25}$ +37.0° (c. 1.62, chloroform).

Analysis.—Calc'd for $C_{20}H_{24}ClNO_2S$: C, 63.56; H, 6.40; N, 3.71. Found: C, 63.87; H, 6.48; N, 3.78.

Example 8

Resolution of (±)-1-(β-p-chlorothiophenoxyethyl)-6,7-dimethoxy-2-methyl - 1,2,3,4 - tetrahydroisoquinoline IVa and b.—(±)-1-(β-p-chlorothiophenoxyethyl)-6,7-dimethoxy - 2 - methyl - 1,2,3,4 - tetrahydroisoquinoline (18.7 g., 0.0495 mole) and (+)-2′,4′-dichlorotartranilic acid (8.4 g., 0.0286 mole) were taken up in 125 ml. hot ethyl acetate, filtered and cooled for crystallization. The crystals were collected and washed with 25 ml. cold ethyl acetate. The mother liquor was retained for isolation of the (+) isomer. The crystals (15.8 g.) were recrystallized from 125 ml. ethyl acetate to give 14.3 g. pure (−) isomer salt, M.P. 115.5–116.5°, $[\alpha]_D^{25}$ +42.6° (c. 1.8, CHCl₃). This material was shaken with 50 ml. water containing 2.5 g. sodium hydroxide and 50 ml. methylene chloride. The solid material was removed by filtration and the methylene chloride layer was separated. The aqueous layer was extracted once more with methylene chloride. The combined extracts were dried over $K_2CO_3$, filtered through diatomaceous earth ("Celite") and concentrated to dryness to leave colorless oil (7.5 g.) which crystallized. Recrystallization of this material from 85% methanol-water gave 4.1 g. pure (−) isomer, M.P. 54.0–55.0°, $[\alpha]_D^{25}$ −38.4° (c. 2.0, CHCl₃). Its infrared spectrum is identical to that of material prepared by Example 7.

This is the (S)-isomer in the nomenclature of Cahn, Ingold and Prelog, Experientia, XII(3), 81–94 (March 15, 1956).

This (S)-isomer was converted to its hydrogen fumarate in the following manner. (−)-1-(β-p-chlorothiophenoxyethyl)-6,7-dimethoxy-2 - methyl - 1,2,3,4 - tetrahydroisoquinoline (189 mgm.) and fumaric acid (58 mgm.) were taken up in 2.5 ml. hot isopropyl alcohol which on slow cooling to 5° C. deposited crystalline (S)-isomer hydrogen fumarate which was collected by centrifugation, dried, found to weigh 240 mgm., to melt at 136.5–138.5° C. corrected and to exhibit $[\alpha]_D^{25}$ +21.9° (c. 2.04, 95% ethanol).

Analysis.—Calc'd for $C_{20}H_{24}ClNO_2S \cdot C_4H_4O_4$: C, 58.35; H, 5.71; N, 2.84. Found: C, 58.73, 59.49, 57.99, 58.90; H, 5.76, 6.05, 5.57, 5.99; N, 2.79.

The (+) isomer was obtained from the mother liquor of the first crystallization of the salt. The ethyl acetate solution was cooled in ice-water bath, treated with decolorizing charcoal, and filtered through Celite. This was washed with 50 ml. 10% potassium carbonate, filtered and concentrated to dryness to leave an oil (9.4 g.). This oil was crystallized from mixed lower alkanes ("Skellysolve B") then 85% methanol to give 5.4 g. of material rich in the (+) isomer, $[\alpha]_D^{25}$ +23.2° (c. 2.0, CHCl₃). From the mother liquors of these crystallizations was recovered 2 g. of material which on crystallization from 85% methanol-water yielded pure (+) isomer IVb (1.4 g.), M.P. 53.5–55.0°, $[\alpha]_D^{25}$ +37.8° (c. 1.9, CHCl₃).

This (R)-isomer was converted to its hydrogen fumarate in the following manner. (+)-1-(β-p-chlorothiophenoxyethyl)-6,7-dimethoxy-2 - methyl - 1,2,3,4 - tetrahydroisoquinoline (2.00 g., 0.0053 mole) and fumaric acid (0.615 g., 0.0053 mole) were combined and taken up in 35 ml. isopropyl alcohol. The solution was filtered, evaporated to about 30 ml. under a stream of nitrogen and stored at room temperature to permit the crystallization of the R isomer hydrogen fumarate which was collected, dried at 56° C./0.05 mm. and found to weigh 2.40 g., to melt at 129.0–131.0° C. corrected and to exhibit $[\alpha]_D^{25}$ −21.8° (c. 2.02, 95% ethanol).

Analysis.—Calc'd for $C_{20}H_{24}ClNO_2S \cdot C_4H_4O_4$: C, 58.35; H, 5.71; N, 2.84. Found: C, 58.20; H, 5.86; N, 3.02.

All or virtually all of the analgesic activity resides in this (R)-isomer, whether it is in the form of the free base or an acid addition salt.

The (R)- and (S)-isomer hydrogen fumarates prepared above have different melting points because they were isolated as different crystalline forms; this is indicated by their infrared absorption spectra which were identical when taken in solution, i.e. in a 9:1 mixture of chloroform and methanol (cf. 2000 cm.⁻¹–1250 cm.⁻¹ region).

Equal weights of (R)- and (S)-isomer hydrogen fumarate were mixed in hot isopropyl alcohol; cooling gave the crystalline racemic hydrogen fumarate of compound IV, M.P. 120.0–121.0° C. corrected, which also had the same infrared absorption spectrum in solution as did a sample of this salt prepared directly from racemic base.

The partially resolved material could be purified as follows. 4 g. ($[\alpha]_D^{25}$ +23°) of this material was taken up in 50 ml. isopropanol and treated with 0.5 ml. conc. hydrochloric acid, concentrated to 25 ml. and cooled. The crystalline material was removed by filtration (racemic HCl salt). The filtrate was concentrated, taken up in ethyl acetate, filtered, washed with dilute sodium carbonate, dried over sodium sulfate and concentrated to dryness. This residue was crystallized from 85% methanol-water to yield pure (+) isomer (IVb) (1.2 g.), M.P. 53.0–55.0°, $[\alpha]_D^{25}$ +37.5° (c. 1.9, CHCl₃). The infrared spectra of these two samples are identical to that of material prepared by Example 7.

The present inventor was unable to resolve this compound (IV) by the use of its salts with the known resolving agents d-camphoric acid, d-tartaric acid, l-dibenzoyltartaric acid, d-tartranilic acid, phenoxymethylpenicillin, benzylpenicillin, d-malic acid, d-mandelic acid, d-10-camphorsulfonic acid, d-α-bromo-π-camphorsulfonic acid, and l-pyroglutamic acid despite the fact that the last-named three acids formed well-defined, crystalline salts with compound IV.

Example 9

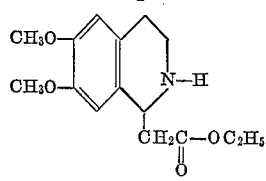

A. R. Baltersby, R. Binks and T. P. Edwards, J. Chem. Soc., 1960, 3474 were able to achieve only partial resolution of compound VI by the use of 1-dibenzoyltartaric acid. They report that twelve crystallizations of the 1-dibenzoyltartrate of compound VI gave roughly 50% resolved amine as an oil, $[\alpha]_D^{25}$ —26.9° (ethanol).

By contrast, use of the (+)-2′-nitro-tartranilic acid of the present invention gave resolved amine having $[\alpha]_D^{25}$ of +50.7° and —51.0°, respectively, in excellent yield after only one recrystallization of the (+)-2′-nitrotartranilate.

Resolution of (±)-6,7-dimethoxy-1,2,3,4 - tetrahydroisoquinoline-1-acetic acid ethyl ester VI.—A warm solution of (±)-6,7-dimethoxy - 1,2,3,4 - tetrahydroisoquinoline-1-acetic acid ethyl ester (24.8 g.; 0.089 mole) in 150 ml. 95% ethanol was treated with a warm solution of (+)-2′-nitrotartranilic acid (12.0 g.; 0.0445 mole) in 150 ml. 95% ethanol. After cooling the crystals were collected (23.9 g.) and recrystallized from 75% ethanol to give 20.5 g. of (+)-2′-nitrotartranilic acid salt of (+)-6, 7-dimethoxy-1,2,3,4-tetrahydroisoquinoline-1 - acetic acid ethyl ester, M.P. 194.5–196.5°. The first mother liquor was retained for isolation of the (—) isomer.

(+)- 6,7 - dimethoxy - 1,2,3,4 - tetrahydroisoquinoline-1-acetic acid ethyl ester.—The above salt was treated with 100 ml. water and 10.5 g. sodium carbonate and extracted with ethyl acetate. The ethyl acetate extracts were dried over sodium sulfate, filtered and concentrated to yield 10 g. (81%) crystalline (+) isomer. This material was further purified by crystallization of its oxalate salt (95% ethanol) followed by crystallization of the free base from ethyl acetate-"Skellysolve B" to give 7.5 g. analytical material, M.P. 85.5–86.5°, $[\alpha]_D^{25}$ +50.7° (c. 1.84, 95% ethanol). Oxalate salt M.P. 170.5–172.0°, $[\alpha]_D^{25}$ +36.2° (c. 1.53, water).

Analysis.—Calc'd for $C_{15}H_{21}NO_4$: C, 64.49; H, 7.58; N, 5.01. Found: C, 64.70; H, 7.68; N, 4.83.

(—)-6,7-dimethoxy-1,2,3,4 - tetrahydroisoquinoline - 1-acetic acid ethyl ester.—The mother liquor from the salt formation was concentrated to dryness. The residue was taken up in 100 ml. abs. ethanol, treated with 1 g. 2′-nitrotartranilic acid, cooled, filtered and concentrated to dryness. The residue was taken up in ethyl acetate, washed with 10% sodium carbonate, dried over potassium carbonate, filtered through diatomaceous earth ("Celite") and concentrated to dryness to leave a crystalline residue (8.5 g.), which was crystallized from ethyl acetate-"Skellysolve B" to give 5.3 g. (43%) of (—) isomer. This material was purified for analysis through its oxalate salt to give pure (—) isomer (60% recovery), M.P. 86.0–87.0°, $[\alpha]_D^{25}$ —51.0° (c. 1.88, 95% ethanol). Oxalate salt M.P. 169.5–171.0°, $[\alpha]_D^{25}$ —36.4 (c. 1.64, water).

Analysis.—Calc'd for $C_{15}H_{21}NO_4$: C, 64.49; H, 7.58; N, 5.01. Found: C, 64.87, 64.64; H, 7.70, 7.55; N, 5.14.

PREPARATION OF RACEMIC AMINES

The preparation of the novel amines used as starting reagents in Examples 7 and 8 above does not form a part of the present invention and was carried out as follows:

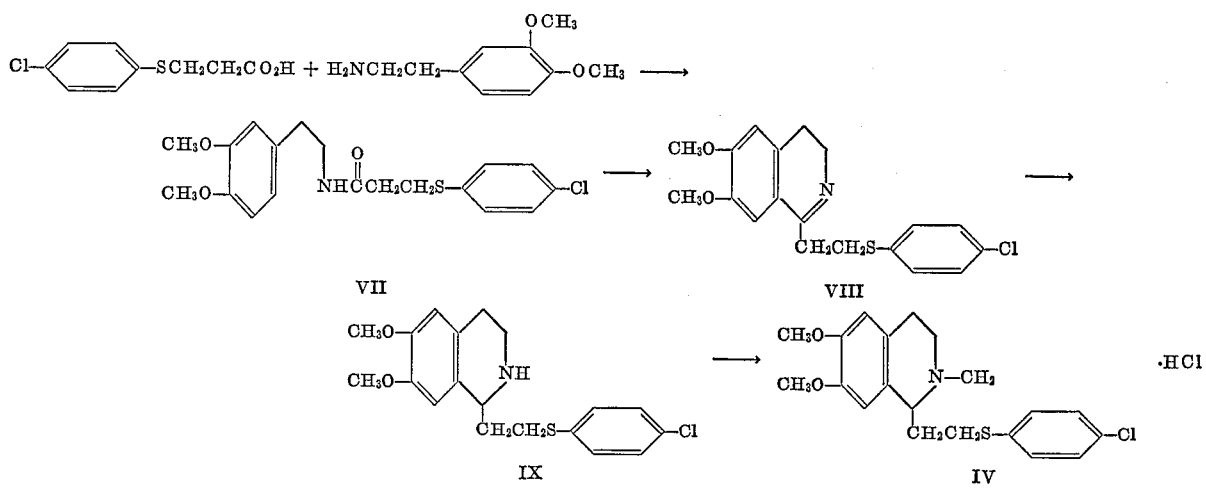

β-(-p-chlorothiophenoxy)propionic homoveratrylamide (VII).—A stirred mixture of 129 g. (0.59 mole) of β-p-chlorothiophenoxypropionic acid [1] and 108 g. (0.59 mole) of homoveratrylamine in 1½ liters of toluene was heated under reflux for 4½ days using a Dean-Stark Trap to remove water. The solution was cooled to approximately 60° C., diluted with 500 ml. of dry warm "Skelly-solve B" (mixed lower alkanes), and then cooled to 5° C. for crystallization. Collection of the crystals gave 178 g. of crude material. A small portion was recrystallized from acetone-water containing a few drops of acetic acid to yield an alalytical sample, M.P. 82–84° C.

Analysis.—Calc'd for $C_{19}H_{22}ClNO_3S$: C, 60.07%; H, 5.84%; N, 3.68%. Found: C, 60.05%; H, 5.89%; N, 3.42%.

1 - (β-p-chlorothiophenoxyethyl)-6,7-dimethoxy-3,4-dihydroisoquinoline (VIII).—A stirred solution of 10 g. (0.026 mole) β-p-chlorothiophenoxypropionic homoveratrylamide VII and 25 ml. phosphoryl chloride in 50 ml. of toluene was heated under reflux for one hour. The solution was allowed to cool to room temperature with continued stirring for two hours. One hundred ml. of water was slowly added. The aqueous layer was separated, basified with sodium carbonate, and extracted with ethyl acetate. The ethyl acetate extracts, after drying over anhydrous sodium sulfate and concentrating to dryness, yielded 6.7 g. of crude crystalline product. Two recrystallizations from acetone gave an analytical sample, M.P. 110–111° C.

Analysis.—Calc'd for $C_{19}H_{20}ClNO_2S$: C, 63.05%; H, 5.57%; N, 3.87%. Found: C, 63.30%; H, 5.74%; N, 3.60%.

---
[1] F. Krollpfeiffer, H. Schultze, E. Schlumbohm and E. Sommermeyer, Ber. 58, 1654 (1925).

1 - (-β-p-chlorothiophenoxyethyl)-6,7-dimethoxy-1,2,3,4-tetrahydroisoquinoline (IX).—To a stirred suspension of 9.0 g. (0.025 mole) 1-(β-p-chlorothiophenoxyethyl)-6,7-dimethoxy-3,4-dihydroisoquinoline VIII in 100 ml. absolute ethanol kept in a water bath maintained at 60–65° C. was added slowly 1 g. of sodium borohydride. Stirring at 60–65° C. was continued for 1½ hours after the addition. After the solution had cooled to room temperature, 6 N hydrochloric acid was added until hydrogen evolution had ceased. Most of the solvent was evaporated under reduced pressure. The residue was neutralized with 10% sodium carbonate, and extracted with ethyl acetate. The ethyl acetate layers were washed with saturated sodium chloride, dried over anhydrous potassium carbonate and concentrated to dryness to give a crude oil which crystallized spontaneously. Yield, less than 50%. The crude material was recrystallized from methanol to yield an analytical sample, M.P. 79–80° C.

*Analysis.*—Calc'd for $H_{19}C_{22}ClNO_2S$: C, 62.71%; H, 6.09%; N, 3.85%. Found: C, 62.96%; H, 6.20%; N, 3.64%.

1 - (-β-p-chlorothiophenoxyethyl)-6,7-dimethoxy-1,2,3,4-tetrahydroisoquinoline (IX) alternate procedure using $LiAlH_4$).—To a stirred suspension of 0.33 g. (0.009 mole) lithium aluminum hydride in 50 ml. of tetrahydrofuran was added over a period of one-half hour 10 g. (0.028 mole) of 1-(β-p-chlorothiophenoxyethyl)-6,7-dimethoxy-3,4 - dihydroisoquinoline VIII dissolved in 75 ml. of tetrahydrofuran. The suspension was stirred for 3½ hours at room temperature. Ten ml. of saturated sodium sulfate was cautiously added to decompose any excess hydride; the suspension was stirred until completely white. Solid sodium sulfate was added and the solids were removed by filtration. The solution was concentrated to dryness to give 10 g. of crude crystalline material. One recrystallization from isopropanol gave 7.2 g. of product, M.P. 81–82° C. Its infrared spectrum was identical to the sodium borohydride product.

1 - β - p - chlorothiophenoxyethyl)-6,7-dimethoxy-2-methyl - 1,2,3,4 - tetrahydroisoquinoline hydrochloride (IV).—A solution of 25 ml. 88% formic acid, 7 ml. 40% formaldehyde, and 8.5 g. (0.023 mole) of 1-(β-p-chlorothiophenoxyethyl) - 6,7 - dimethoxy-1,2,3,4-tetrahydroisoquinoline IX was heated on a steam bath for two hours. Six ml. concentrated hydrochloric acid was added and the solution was concentrated to dryness to give the crude product which was recrystallized from methanol to give 9.2 g. analytically pure material, M.P. 197–199° C. (decomp.).

*Analysis.*—Calc'd for $C_{20}H_{24}ClNO_2S \cdot HCl$: C, 57.96%; H, 6.22%; N, 3.38%. Found: C, 57.88%; H, 6,29%; N, 3.08%.

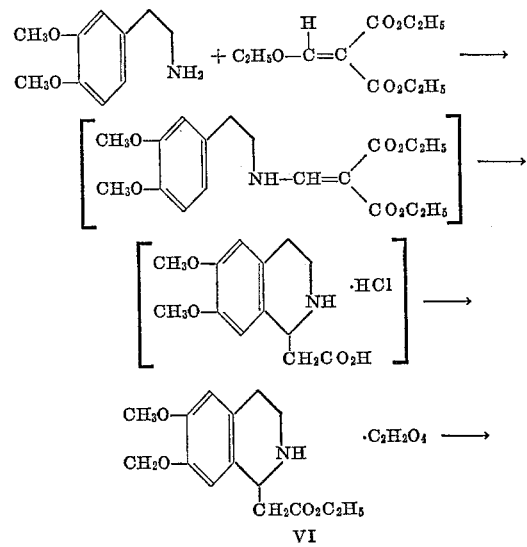

VI

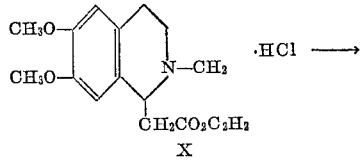

X

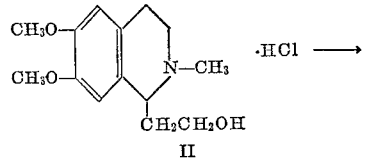

II

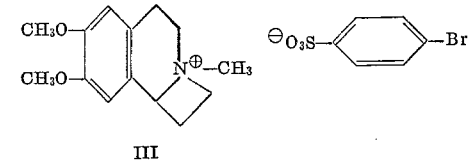

III 6,7 - dimethoxy-1,2,3,4-tetrahydroisoquinoline-1-acetic acid ethyl ester oxalate (VI) [A. L. Bluhm and W. J. Gensler, J. Org. Chem. 21, 336–339 (1956)].—To a stirred solution of 216.9 g. (1 mole) distilled diethyl ethoxymethylenemalonate in 1 liter of absolute ethanol was added slowly 181.2 g. (1 mole) of distilled homoveratrylamine in a nitrogen atmosphere. The reaction mixture was stirred for 16 hours at room temperature and then concentrated to dryness. The resultant oil was taken up in 2 liters of 24% hydrochloric acid, heated on a steam bath for 4 hours and then concentrated to dryness to give a yellow oil. This oil was taken up in 1 liter of absolute ethanol, filtered to remove insoluble material, saturated with gaseous hydrogen chloride with cooling, stored at room temperature for one day and then concentrated to dryness to give an oil. This was retaken up in one liter of absolute ethanol, saturated with gaseous hydrogen chloride with cooling, stored at room temperature for one day and again concentrated to dryness. The resultant brown oil was basified with aqueous sodium carbonate, extracted with chloroform, dried over sodium sulfate, and concentrated to an oil which gave a crystalline oxalate with 90 g. of oxalic acid from acetone. One recrystallization from 95% ethanol yielded 228.1 g. (61.7%) of 6,7-dimethoxy-1,2,3,4-tetrahydroisoquinoline-1-acetic acid ethyl ester oxalate. Several recrystallizations from 95% ethanol gave an analytical sample M.P. 136–164° C. (poorly defined).

*Analysis.*—Calc'd for $C_{15}H_{21}NO_4 \cdot C_2H_2O_4$: C, 55.28; H, 6.26; N, 3.79. Found: C, 55.28; H, 6.25; N, 3.81.

6,7-dimethoxy-2-methyl - 1,2,3,4 - tetrahydroisoquinoline-1-acetic acid ethyl ester hydrochloride (X) [A. Brossi et al., Helv. Chim. Acta. 43, 583–593 (1960)].—To 3.8 g. (0.0135 mole) of 6,7-dimethoxy-1,2,3,4-tetrahydroisoquinoline-1-acetic acid ethyl ester, obtained from the oxalate by neutralization with sodium carbonate, was added 1.2 ml. of 40% formaldehyde and 3.6 ml. of 88% formic acid. The reaction mixture was heated on a steam bath for 2 hours. Three ml. of 6 N hydrochloric acid were added and the solution was concentrated to dryness to yield 4.5 g. (100%) of crude crystalline 6,7-dimethoxy-2-methyl - 1,2,3,4 - tetrahydroisoquinoline-1-acetic acid ethyl ester hydrochloride. One recrystallization from absolute ethanol gave analytical material M.P. 179–183° C.

*Analysis.*—Calc'd for $C_{16}H_{23}NO_4 \cdot HCl$: C, 58.26; H, 7.34; N, 4.25. Found: C, 58.36; H, 7.38; N, 4.32.

6,7-dimethoxy-1-β-hydroxyethyl - 2 - methyl - 1,2,3,4-tetrahydroisoquinoline hydrochloride (II).—To a stirred suspension of 7.6 g. (0.2 mole) lithium aluminum hydride in 100 ml. of tetrahydrofuran was added slowly 58.5 g. (0.2 mole) of 6,7-dimethoxy-2-methyl-1,2,3,4-tetrahydroisoquinoline-1-acetic acid ethyl ester (obtained from the hydrochloride by neutralization with sodium carbonate) in 150 ml. of tetrahydrofuran. The suspension was refluxed for four hours. Twenty-five ml. of water were cautiously added and the suspension was stirred with warming until white. Anhydrous sodium sulfate was added and the solids removed by filtration. The filtrate was concentrated to dryness to give 49.9 g. (99.3%) of an oil which gave crystalline 6,7-dimethoxy-1-β-hydroxyethyl-2-methyl-1,2,3,4-tetrahydroisoquinoline hydrochloride from acetone. One recrystallization from absolute ethanol yielded 42.6 g. of analytical material M.P. 179–182° C.

*Analysis.*—Calc'd for $C_{20}H_{24}BrNO_5S$: C, 51.07; H, 7.71; N, 4.87. Found: C, 58.26; H, 7.88; N, 4.77.

[2,1-a]azetidino-6,7-dimethoxy-2-methyl - 1,2,3,4-tetrahydroisoquinolinium p-bromobenzenesulfonate (III).—To a stirred solution at room temperature of 5.3 g. (.021 mole) of 6,7-dimethoxy-1-β-hydroxyethyl-2-methyl-1,2,3,4-tetrahydroisoquinoline (obtained from the hydrochloride by neutralization with sodium carbonate) in 100 ml. of chloroform was added 5.5 g. (.0216 mole) of p-bromobenzenesulfonyl chloride. Stirring was continued for four hours. Anhydrous sodium carbonate (11.2 g.) was added and stirring was continued for 16 hours. The mixture was filtered and the filtrate concentrated to give 9.6 g. (97%) of crude crystalline material. Several recrystallizations from isopropanol yielded analytically pure [2,1-a]azetidino-6,7-dimethoxy-2-methyl - 1,2,3,4-tetrahydroisoquinolinium p - bromobenzenesulfonate, M.P. 182–184.5° C.

*Analysis.*—Calc'd for $C_{20}H_{24}BrNO_5S$: C, 51.07; H, 5.14; N, 2.98. Found: C, 51.01; H, 5.29; N, 2.92.

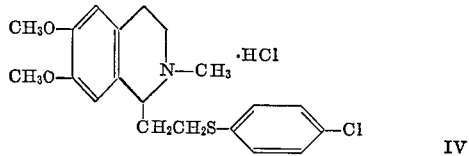

IV 1-(β-p-chlorothiophenoxyethyl) - 6,7 - dimethoxy - 2-methyl-1,2,3,4-tetrahydroisoquinoline hydrochloride.—A solution of 80.5 mg. (0.002 mole) sodium hydroxide and 310 mg. (0.002 mole) p-chlorothiophenol in 30 ml. ethanol was mixed with 1 g. (0.0021 mole) [2,1-a]azetidino-6,7-dimethoxy - 2 - methyl-1,2,3,4-tetrahydroisoquinolinium-p-bromobenzenesulfonate and heated one and one-half hours on a steam bath. The mixture was concentrated to dryness at reduced pressure. The residue was treated with water and extracted with chloroform. The chloroform extracts were dried over magnesium sulfate, filtered and concentrated to dryness to leave an oil which yielded 580 mg. (67%) of crystalline product from acetone-dry hydrogen chloride. Recrystallization from methanol gave analytically pure 1-(β-p-chlorothiophenoxyethyl)-6,7-dimethoxy-2-methyl - 1,2,3,4-tetrahydroisoquinoline hydrochloride, M.P. 197–199° C.

It is an additional advantage of the acids of the present invention that they crystallize well from water and thus may be recovered for re-use in high yield and good quality, i.e. with no loss in rotation, by simply acidifying and then cooling the aqueous solution of sodium carbonate used to liberate resolved amine from the recrystallized, resolved acid addition salt.

The (+)-tartaric acid illustrated above is replaced by (—) tartaric acid to give the other optical isomer of the compounds of the present invention; the latter are used in the same manner to achieve the same results.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:

1. The optically active acid having the formula

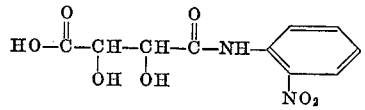

2. The optically active acid having the formula

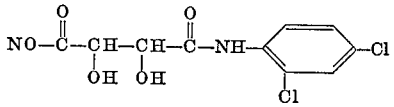

3. The optically active acid having the formula

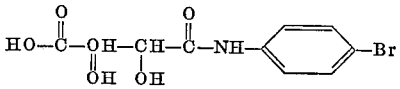

4. The optically active acid having the formula

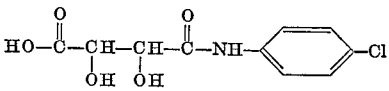

5. The optically active acid having the formula

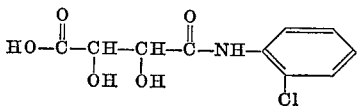

References Cited

J. Chem. Soc., by Barrow et al., 1939, pp. 638–640 relied on.

J.A.C.S. by Tingle et al., vol. 31 (1909), pp. 1312 to 1316 relied on.

LORRAINE A. WEINBERGER, *Primary Examiner.*

L. A. THAXTON, *Assistant Examiner.*

U.S. Cl. X.R.

260—289, 505

PO-1050
(5/69)

UNITED STATES PATENT OFFICE
CERTIFICATE OF CORRECTION

Patent No. 3,452,086                    Dated June 24, 1969

Inventor(s) Thomas Alfred Montzka

It is certified that error appears in the above-identified patent and that said Letters Patent are hereby corrected as shown below:

In claim 2 the formula should read

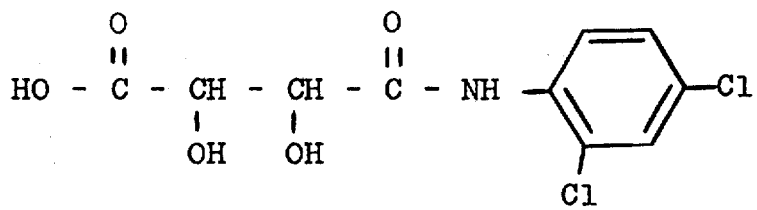

In claim 3 the formula should read

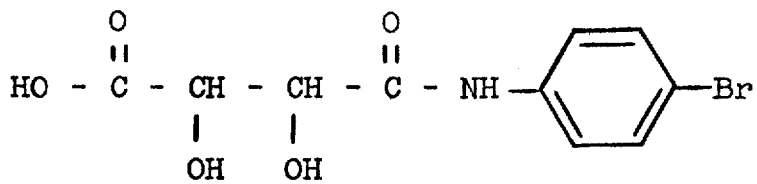

SIGNED AND
SEALED
MAR 17 1970

(SEAL)
Attest:

Edward M. Fletcher, Jr.
Attesting Officer

WILLIAM E. SCHUYLER, JR.
Commissioner of Patents